Aug. 4, 1953 W. A. GEOHEGAN 2,648,027
BEAM-INTENSITY CONTROLLING CIRCUIT
FOR CATHODE-RAY OSCILLOGRAPH
Filed Sept. 4, 1951
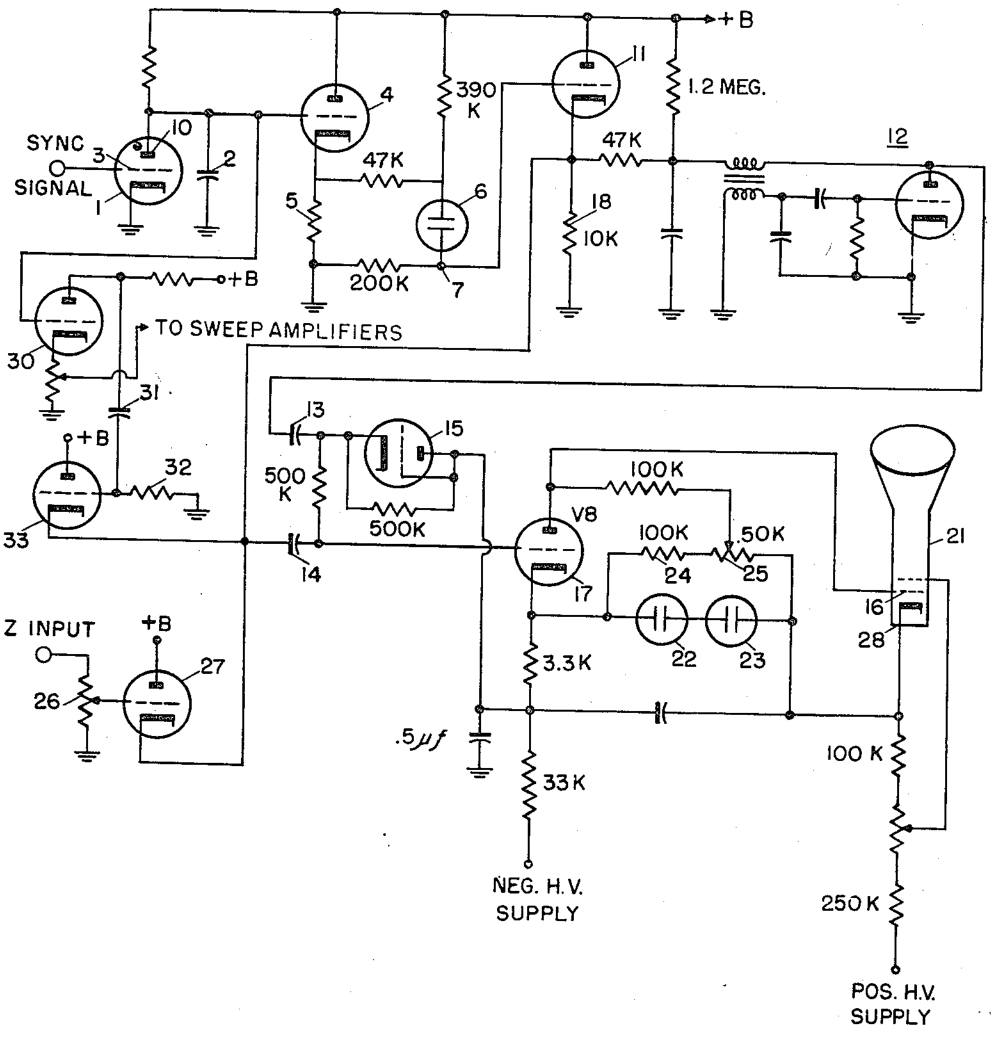
INVENTOR.
WILLIAM A. GEOHEGAN
BY Darby & Darby
ATTORNEYS Patented Aug. 4, 1953

2,648,027

UNITED STATES PATENT OFFICE 2,648,027

BEAM-INTENSITY CONTROLLING CIRCUIT FOR CATHODE-RAY OSCILLOGRAPH

William A. Geohegan, Brooklyn, N. Y., assignor to Allen B. Du Mont Laboratories, Inc., Clifton, N. J., a corporation of Delaware Application September 4, 1951, Serial No. 244,941

1 Claim. (Cl. 315—22)

The present invention relates to a cathode ray tube circuit particularly for use in an oscillograph. More particularly still the invention relates to a circuit for increasing the intensity of the cathode beam during the presentation of a signal and decreasing the intensity of the beam during the retrace interval when the oscillograph employs a recurrent sweep. Still more particularly, this invention pertains to modifying the relative potential between the control grid and the cathode of the cathode ray tube while retaining good low frequency response.

In the design of most cathode ray oscillographs both the cathode and grid are operated at a very high negative voltage with respect to ground. Therefore, it was impractical to directly apply the beam modulating signal other than through a capacitive coupling which resulted in the poor low frequency response above-mentioned. By my method a circuit is employed which permits direct application of the beam modulating signal but without affecting the low frequency response.

It is an object of the present invention to provide means for applying a beam modulating signal to the cathode ray tube while retaining good low frequency response.

It is a further object to provide means for blanking the beam during the retrace interval, when using a recurrent sawtooth sweep signal to provide a time axis.

Additional objects will be apparent after a study of the following specification in connection with the drawing, in which The single figure is a schematic diagram of an embodiment of the invention.

A gaseous discharge tube 1 is connected as a conventional sawtooth generator having a condenser 2 connected across the output thereof. This condenser 2 is discharged when a synchronizing signal is applied to the grid 3. The sawtooth voltage occurring at the plate 10 is applied to the grid of a tube 4. This triode tube 4, having a resistor 5 in the cathode lead, operates as a cathode follower and normally the grid current maintains the plate potential of tube 1 below its firing potential. At the same time the tube current develops sufficient voltage across the cathode resistor 5 to permit the glow tube 6 to conduct. When the gaseous discharge tube 1 is triggered, the cathode current of tube 4 follows the more negative saw potential existing at the plate 10 of tube 1, reducing the voltage applied to the glow tube 6, thus causing it to be extinguished. As a result, a negative gate voltage exists at the lower terminal 7 of this glow tube.

This negative gate voltage is applied to the grid of a cathode follower tube 11 which is connected in series with the plate supply of an oscillator 12. This oscillator is free running and modulated negatively by the gate voltage, i. e., the oscillator output is reduced as the gate voltage is increased. The modulated output signal of this oscillator is coupled through a pair of condensers 13 and 14 to a diode rectifier 15 at the cathode ray tube cathode potential. The signal, after being rectified, is filtered and applied to the control grid 16 of the cathode ray tube 21 through an amplifier 17 bypassed by two glow tubes 22 and 23 which serve to maintain the potential of the cathode 28 constant when the amplifier 17 is cut off. The coupling through the negative high voltage supply is reduced and any time constant effects that would otherwise exist are eliminated.

A fixed resistor 24 and a potentiometer 25 are connected in series across the two glow tubes and the bias for the grid 16 of the cathode ray tube, to set the average brightness of the trace, is taken from the sliding contact of the potentiometer 25.

Another triode tube 30, having the grid thereof connected to the output anode of the gaseous discharge tube 1, receives and amplifies the sawtooth voltage therefrom. The amplified and inverted signal is then differentiated by a condenser 31 connected to the anode of the triode 30, and the resistor 32 connected to the grid of another triode 33. The resulting negative voltage spike, when applied to the grid of tube 33, drives this tube negatively reducing the plate current thereof. This tube 33, connected in parallel with tube 11, also changes the output of oscillator 12.

The operation of the circuit is as follows: The action of a synchronizing signal in keying a sawtooth wave for sweeping the beam also modulates the oscillator in a negative sense, i. e., by decreasing the output thereof, such output being coupled capacitively to the rectifier. The output of the rectifier is amplified and applied to the control grid of the cathode ray tube, which is operating at a high negative potential with respect to ground. The polarity of the rectifier and the following amplifier is such that the negative sense modulation of the oscillator results in a more positive potential being applied to the cathode ray tube grid, thus increasing the brightness of the trace on the screen.

To provide for Z-axis modulation for the cathode ray tube presentation, i. e., intensity modulation of the beam of the cathode ray tube, an external signal may be applied across a potentiometer 26 from which a portion is picked off by the movable tap thereon and applied to the grid of a cathode follower tube 27 the cathode of which is also connected in parallel with the cathode of tube 11. This latter tube 27 is effectively in parallel with tubes 11 and 33, and modulates the oscillator 12 accordingly.

For the higher frequencies it may be noted that the oscillator control circuit is bypassed by the condenser 14 which for high frequencies provides a direct coupling to the grid of the D. C. amplifier tube 17.

While a preferred embodiment has been described, modifications will be apparent without departing from the spirit and scope of the invention as defined in the appended claim.

What is claimed is:

In a beam intensity controlling circuit for an oscillograph including a cathode ray tube having a control grid, a cathode and a plurality of anodes, a thermionic tube connected to generate a sawtooth wave, a source of signals connected thereto, a first cathode follower stage having a cathode resistor, said cathode follower stage being connected to the output of said sawtooth generator tube, a glow tube connected in parallel with said cathode resistor to provide a source of negative gate pulses, a source of positive potential, a thermionic tube connected as a free-running oscillator, a second cathode follower stage connected in series between said source of positive potential and said free-running oscillator tube to modulate the output thereof, said source of negative gate pulses being connected to the input of said second cathode follower stage, a rectifier, an amplifier circuit connected between said rectifier and said control grid, a source of high negative potential connected to said rectifier and said amplifier circuit, said rectifier being capacitively coupled to said oscillator tube to isolate said oscillator from said source of high negative potential.

WILLIAM A. GEOHEGAN.

References Cited in the file of this patent

UNITED STATES PATENTS

| Number | Name | Date |
|---|---|---|
| 1,933,219 | Nakajima et al. | Oct. 31, 1933 |
| 2,144,775 | Schlesinger | Jan. 24, 1939 |
| 2,153,655 | Urtel et al. | Apr. 11, 1939 |
| 2,188,647 | Busse | Jan. 30, 1940 |
| 2,292,045 | Burnett | Aug. 4, 1942 |
| 2,369,631 | Zanarini | Feb. 13, 1945 |
| 2,448,771 | Christaldi | Sept. 7, 1948 |
| 2,465,406 | Taylor | Mar. 29, 1949 |